(12) United States Patent
Zhu

(10) Patent No.: US 10,754,193 B2
(45) Date of Patent: Aug. 25, 2020

(54) DISPLAY SUBSTRATE, DISPLAY PANEL AND DISPLAY DEVICE HAVING IMPROVED LUMINANCE

(71) Applicants: BOE TECHNOLOGY GROUP CO., LTD., Beijing (CN); BEIJING BOE SPECIAL DISPLAY TECHNOLOGY CO., LTD., Beijing (CN)

(72) Inventor: Huizhong Zhu, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 99 days.

(21) Appl. No.: 16/053,120

(22) Filed: Aug. 2, 2018

(65) Prior Publication Data
US 2019/0171065 A1    Jun. 6, 2019

(30) Foreign Application Priority Data
Dec. 4, 2017    (CN) .................... 2017 2 1666475 U

(51) Int. Cl.
*G02F 1/1335* (2006.01)
*G02F 1/13357* (2006.01)
*G02B 6/00* (2006.01)
*G02F 1/1362* (2006.01)
*G02B 30/00* (2020.01)

(52) U.S. Cl.
CPC .......... *G02F 1/133606* (2013.01); *G02B 6/00* (2013.01); *G02F 1/133504* (2013.01); *G02F 1/133512* (2013.01); *G02B 30/00* (2020.01); *G02F 1/136209* (2013.01); *G02F 2001/13356* (2013.01); *G02F 2001/133507* (2013.01); *G02F 2001/133607* (2013.01)

(58) Field of Classification Search
CPC ......... G02F 1/133606; G02F 1/133512; G02B 27/22
See application file for complete search history.

(56) References Cited

U.S. PATENT DOCUMENTS 10,261,361 B1\*  4/2019  Pan ................... G02F 1/133605
2019/0113805 A1\*  4/2019  Pan ................... G02F 1/133608

\* cited by examiner

*Primary Examiner* — Joseph L Williams
(74) *Attorney, Agent, or Firm* — Westman, Champlin & Koehler, P.A.

(57) ABSTRACT

A display substrate, a display panel, and a display device are provided. The display substrate includes a substrate body capable of transmitting light and a cover layer arranged on the substrate body to form a predetermined pattern, a plurality of pixel unit spaces are in the predetermined pattern. Light incident from a side of the substrate body to the cover layer is concentrated inside the cover layer and transmitted, and passes through the cover layer in a first direction, an angle between the first direction and a preset plane is less than a preset angle, the preset plane is parallel to the substrate body, the preset angle is less than 90 degrees.

15 Claims, 4 Drawing Sheets

DISPLAY SUBSTRATE, DISPLAY PANEL AND DISPLAY DEVICE HAVING IMPROVED LUMINANCE

CROSS-REFERENCE TO RELATED APPLICATION

The present application claims a priority of the Chinese patent application No. 201721666475.X filed on Dec. 4, 2017, which is incorporated herein by reference in its entirety.

TECHNICAL FIELD

The present disclosure relates to the field of display technologies, and in particular, to a display substrate, a display panel, and a display device.

BACKGROUND

In recent years, with the increasing maturity of photo-electric display technologies, liquid crystal display devices have been used more and more widely because of their long life, high luminous efficiency, low radiation, and low power consumption. For example, liquid crystal display devices are installed and used in mobile phones, computers and vehicle-mounted instruments.

When a liquid crystal display device is installed and used, it is usually required to attach and cover an upper cover glass plate or a touch screen thereto. However, the use of the upper cover glass plate or touch screen may greatly reduce luminance of an image displayed by the liquid crystal display device, and then affect the visual effect of the liquid crystal module under strong light.

Currently, the above problem is generally solved in the related art by improving luminance of backlight. However, an increase in luminance of backlight also increases an increase in difficulty of heat dissipation of the entire display device, and thus it may not be the best solution for improving luminance of images of the display device.

SUMMARY

A display substrate is provided, including a light transmitting substrate body and a cover layer arranged on the substrate body to form a predetermined pattern, a plurality of pixel unit spaces are in the predetermined pattern. The cover layer is configured to enable light incident from a side of the substrate body to the cover layer to be concentrated inside the cover layer and transmitted, and pass through the cover layer in a first direction, an angle between the first direction and a preset plane is less than a preset angle, the preset plane is parallel to the substrate body, and the preset angle is less than 90 degrees.

Optionally, the cover layer includes light conducting portions and light shielding portions. At least a part of the light shielding portions are arranged on a side of the light conducting portions away from the substrate body. The light conducting portions are configured to enable the light incident to the cover layer to be concentrated inside the cover layer and pass through the cover layer in the first direction.

Optionally, the cover layer includes a base layer made of a light shielding material, where light guiding paths are arranged inside the base layer, and light guiding members are arranged within the light guiding paths; and the light conducting portions comprise the light guiding paths and the light guiding members, and the light shielding portions each include includes a portion on the base layer other than the light guiding path.

Optionally, the cover layer includes a base layer made of a light transmitting material and a light shielding layer arranged on a surface of the base layer away from the substrate body; where light guiding members are arranged inside the base layer, the light conducting portions includes the base layer and the light guiding members, and the light shielding portions includes the light shielding layer.

Optionally, each light guiding member includes a light concentrating member and a light reflecting member, and the light reflecting member is arranged on a side of the light concentrating member away from the substrate body.

Optionally, the light concentrating member includes at least one convex lens, and the light reflecting member includes at least one triangular prism.

Optionally, an orthographic projection of each light conducting portion on the substrate body is within an orthographic projection of each light shielding portion on the substrate body.

Optionally, the light guiding members are arranged in an array form within the cover layer.

Optionally, the preset angle is less than 45 degrees.

Optionally, a first region of the cover layer includes the light conducting portions and the light shielding portions, and the light shielding portions in a second region of the cover layer are arranged on an upper surface of the substrate body.

Optionally, the display substrate is a color filter substrate or an array substrate.

Optionally, each light guiding member includes a light concentrating member and a light reflecting member, and the light reflecting member is arranged on a side of the light concentrating member away from the substrate body.

Optionally, the light guiding members are arranged in an array form within the cover layer.

A display panel is further provided, including the above display substrate.

A display device is further provided, including the above display panel.

DETAILED DESCRIPTION OF THE EMBODIMENTS

The technical solutions in the embodiments of the present disclosure are clearly and completely described below in conjunction with the accompanying drawings in the embodiments of the present disclosure. It is obvious that the described embodiments are a part of the embodiments of the present disclosure, rather than all of the embodiments. All other embodiments obtained by those of ordinary skill in the art based on the embodiments of the present disclosure without creative labor fall within the scope of protection of the present disclosure.

In the display substrate in some embodiments of the present disclosure, a cover layer is arranged on the substrate body, a plurality of pixel unit spaces are formed inside the cover layer, and the cover layer has the characteristics of enabling incident light be transmitted internally but not vertically pass through the surface of the cover layer. Based on the structural form and characteristics of the cover layer, the cover layer may satisfy the light shielding property of a black matrix, and is formed as a black matrix on the display substrate. When acting as a black matrix, the cover layer may enable incident light be internally transmitted to pixel units arranged on a side of the black matrix, and therefore when used in a display device, the cover layer may improve light utilization and achieve an effect of improving display luminance.

Figure 1:
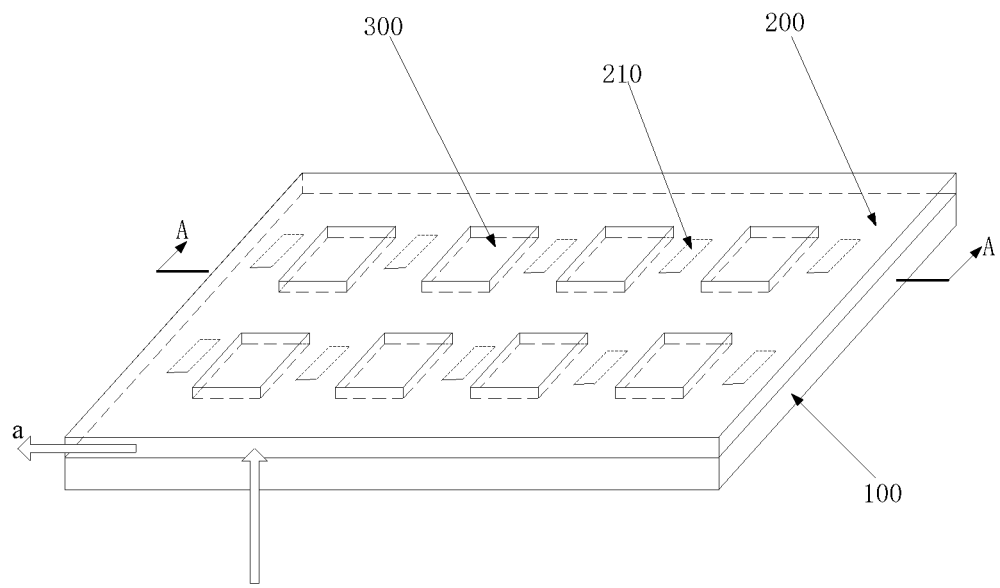
FIG. 1 is a schematic diagram of a stereoscopic structure of a display substrate in some embodiments of the present disclosure.
Figure 2:
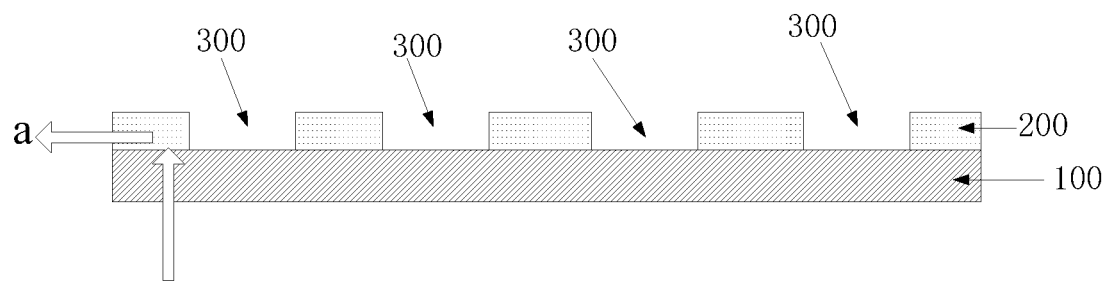
FIG. 2 is a schematic diagram of a cross-sectional structure of a portion A-A of the display substrate shown in FIG. 1.

FIG. 1 is a schematic diagram of a stereoscopic structure of the display substrate in some embodiments of the present disclosure, and FIG. 2 is a schematic diagram of a cross-sectional structure of the display substrate. Referring to FIG. 1 and FIG. 2, the display substrate in some embodiments of the present disclosure includes a substrate body 100 capable of transmitting light and a cover layer 200 arranged on the substrate body 100 to form a predetermined pattern, a plurality of pixel unit spaces 300 are in the predetermined pattern.

Light incident from a side of the substrate body 100 to the cover layer 200 may be concentrated inside the cover layer 200 and transmitted, and pass through the cover layer 200 in a first direction a, where an angle between the first direction a and a preset plane is less than a preset angle, the preset plane is parallel to the substrate body 100, and the preset angle is less than 90 degrees.

In conjunction with FIG. 1 and FIG. 2, the predetermined pattern formed by the cover layer 200 includes pixel unit spaces 300, and according to the predetermined pattern of the cover layer 200, the cover layer 200 may correspondingly form a black matrix. In the cover layer 200 acting as a black matrix, incident light may be internally transmitted and emitted out of the cover layer 200 in a direction with an angle of less than 90 degrees with respect to the substrate body 100, rather than in a direction perpendicular to the substrate body 100, so that the cover layer may satisfy the light shielding property of a black matrix, and when acting as a black matrix, may enable incident light be internally transmitted to pixel units arranged on a side of the black matrix, and further when used in a display device, may improve light utilization and achieve an effect of increasing display luminance.

In some embodiments of the present disclosure, the incident light inside the cover layer 200, after is concentrated inside the cover layer 200, is emitted out of the cover layer 200 in a direction with an angle of less than 90 degrees with respect to the substrate body 100, and transmitted to pixel units arranged on a side of the black matrix, thereby further improving light utilization and achieving an effect of improving display luminance.

Figure 3:
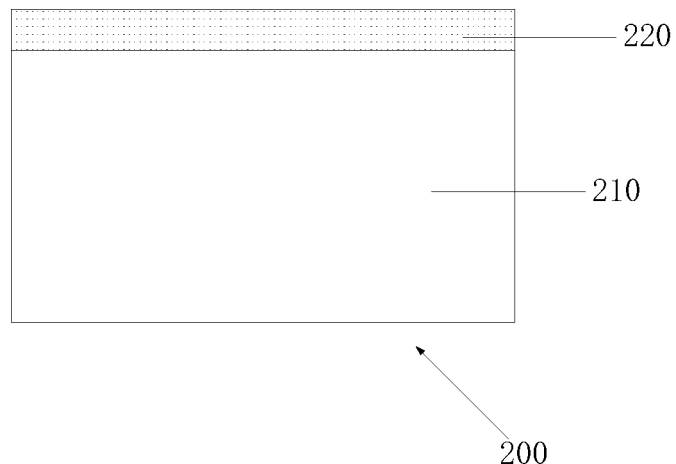
FIG. 3 is a schematic structural diagram of a setting principle of a cover layer in a display substrate in some embodiments of the present disclosure.
Figure 4:
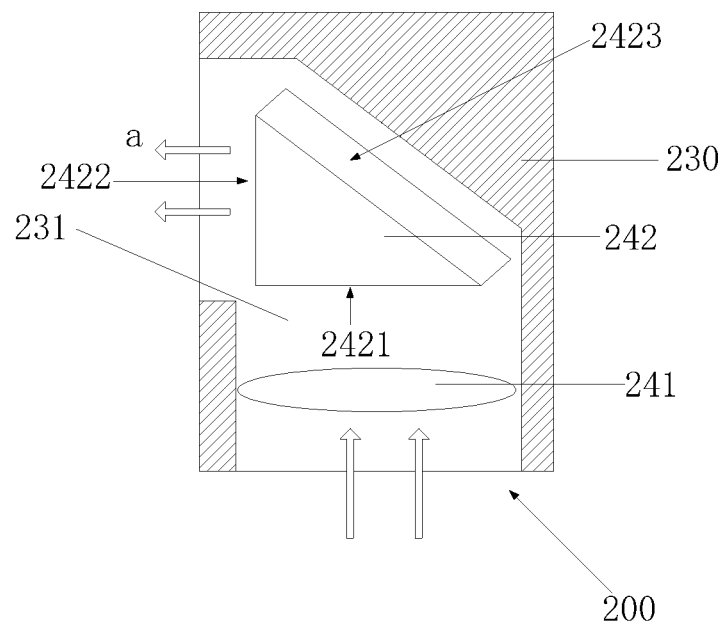
FIG. 4 is a schematic cross-sectional view of a partial structure of a cover layer of a display substrate in some embodiments of the present disclosure.
Figure 5:
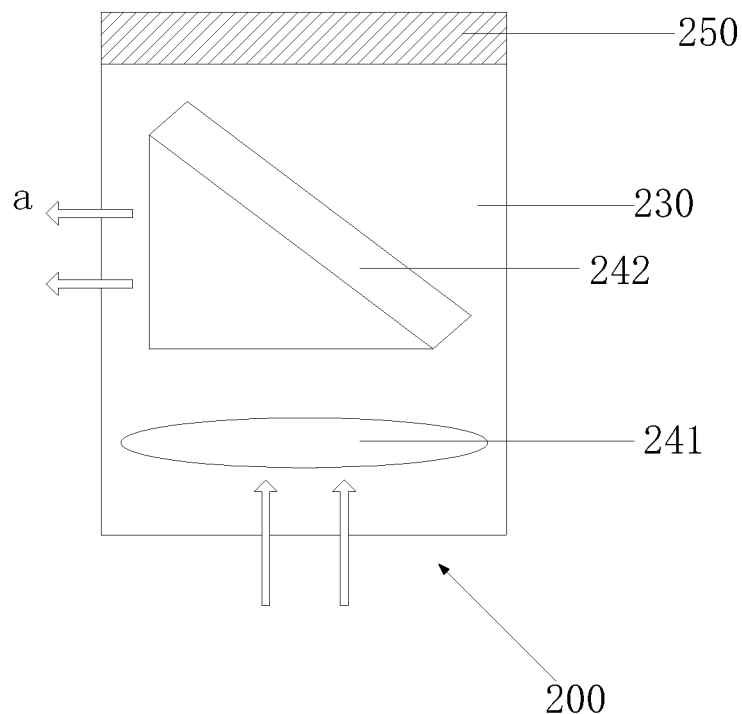
FIG. 5 is a schematic cross-sectional view of a partial structure of a cover layer of a display substrate in some embodiments of the present disclosure.

In some embodiments of the present disclosure, as shown in FIGS. 3, 4, and 5, at least a part of light shielding portions 220 is arranged on a side of light conducting portions 210 away from the substrate body 100.

In the display substrate of some embodiments of the present disclosure, as shown in FIG. 3, the cover layer 200 includes light conducting portions 210 and light shielding portions 220, where the light conducting portion 210 and the light shielding portion 220 are sequentially arranged on a light transmission path, on which light is transmitted inside the cover layer 200 in a direction perpendicular to a preset plane (corresponding to a plane parallel to the substrate body 100), and via the light conducting portion 210, light incident on the cover layer 200 passes through the cover layer 200 in a first direction a, and is transmitted to the pixel units arranged on a side of the black matrix.

FIG. 4 is a schematic cross-sectional view of a partial structure of the cover layer 200 of a display substrate in some embodiments of the present disclosure. Referring to FIG. 4, the cover layer 200 includes a base layer 230 made of a light shielding material, where a light guide path 231 is arranged inside the base layer 230, and a light guiding member is arranged within the light guiding path 231. Specifically, in conjunction with FIG. 3, the light guiding path 231 and the light guiding members are combined to form the light conducting portion 210 for enabling light incident to the cover layer 200 pass through the cover layer in the first direction a and be transmitted to the pixel units arranged on a side of the black matrix. In addition, in conjunction with FIG. 3, a portion on the base layer 230 other than the light guiding path 231 forms the light shielding portion 220 for blocking light incident in a direction perpendicular to the substrate body 100 (in conjunction with FIGS. 1 and 2).

Referring to FIG. 4, inside the cover layer 200, on a light transmission path perpendicular to the preset plane (which is the plane parallel to the substrate body 100 in the embodiment of the present disclosure), the light guiding member includes a light concentrating member 241 and a light reflection member 242 which are sequentially arranged. Specifically, the light concentrating member 241 includes at least one convex lens, and the light reflecting member includes at least one triangular prism. The convex lens is arranged for concentrating incident light inside the cover layer 200, so as to concentrate light incident from a backlight to the display substrate within the light guiding path 231; and the triangular prism is arranged for changing the direction of transmission of the light concentrated by the convex lens such that the light passes through the cover layer 200 in the first direction a to the pixel units arranged on a side of the black matrix.

In some embodiments of the present disclosure, as shown in FIG. 4, the light reflecting member 242 is arranged on a side of the light concentrating member 241 away from the substrate body 100.

In some embodiments of the present disclosure, as shown in FIG. 4, the convex lens formed as the light concentrating member 241 is arranged in such a manner that a central surface thereof is parallel to the substrate body 100; the triangular prism formed as the light reflecting member 242 is arranged in such a manner that a first plane 2421 is parallel to the central surface of the convex lens, a second plane 2422 is at a preset angle with (e.g. perpendicular to) the first plane 2421, and a third plane 2423 connecting the first plane 2421 and the second plane 2422 is formed as a slope. The light emitted by the light concentrating member 241 is incident on the inside of the light reflecting member 242 via the first plane 2421, reflected by the third plane 2423, and then emitted through the second plane 2422.

In addition, with the arrangement of the light reflecting member 242, all the light rays emitted through the second plane 2422 are in the first direction a.

It may be understood that the specific structures of the light guiding members arranged within the light guiding path 231 are only some implementation structures for concentrating light inside the cover layer 200 and emitting same in the first direction, but the specific implementation structures are not limited to including only the one.

In some embodiments of the present disclosure, the light guiding path 231 may be made of a light transmitting material, where the light concentrating member 241 and the light reflecting member 242 are embedded inside the light transmitting material.

The cover layer 200 in some embodiments of the present disclosure, with the light concentrating member 241 and the light reflecting member 242 arranged inside the light guiding path 231, may enable incident light to be concentrated inside the cover layer 200 and so as to be emitted out from the cover layer 200 in the first direction. The light shielding property of the base layer 230 made of a light shielding material is used to prevent the incident light from is emitted out from the cover layer 200 in a direction perpendicular to the substrate body 100, so that the cover layer may satisfy the light shielding property of a black matrix, and when used as the black matrix, may enable the incident light to be internally transmitted, and when used in a display device, may improve light utilization and achieve an effect of improving display luminance.

Additionally, in the cover layer of some embodiments of the present disclosure, the base layer 230 from which the cover layer 200 is formed may generally be made of a material of which the black matrix is made.

FIG. 5 is a schematic cross-sectional view of a partial structure of the cover layer 200 of the display substrate in some embodiments of the present disclosure. As shown in FIG. 5, the cover layer 200 includes a base layer 230 made of a light transmitting material and a light shielding layer 250 arranged on a surface of the base layer 230 away from the incident light. Wherein a light guiding member is arranged inside the base layer 230. In conjunction with FIG. 3, the base layer 230 and the light guiding member form the light conducting portion 210 of the cover layer 200 for enabling light incident to the cover layer 200 pass through the cover layer 200 in a first direction a. The light shielding layer 250 forms the light shielding portion 220 of the cover layer 200 for blocking light emitted out in a direction perpendicular to the substrate body 100 (in conjunction with FIGS. 1 and 2).

Specifically, with the same structure as in the above embodiment, inside the cover layer 200, on a transmission light path perpendicular to a preset plane (which is the plane parallel to the substrate body 100 in the embodiment of the present disclosure), the light guiding member includes a light concentrating member 241 and a light reflecting member 242 which are sequentially arranged. Specifically, the light concentrating member 241 includes at least one convex lens, and the light reflecting member includes at least one triangular prism. The convex lens is arranged for concentrating incident light inside the cover layer 200, so as to concentrate light incident from a backlight to the display substrate within the light guiding path 231; and the triangular prism is arranged for changing the direction of transmission of the light concentrated by the convex lens such that the light passes through the cover layer 200 in the first direction a to the pixel units arranged on a side of the black matrix.

The specific structures of the light concentrating member 241 and the light reflecting member 242 are the same as in the above embodiment, and details thereof will not be described herein.

In the cover layer 200 in some embodiments of the present disclosure, providing the light concentrating member 241 and the light reflecting member 242 inside the base layer 230 made of a light transmitting material, may enable incident light to be concentrated inside the cover layer 200 and be emitted out from the cover layer 200 in a first direction. The light shielding property of the light shielding layer 250 is utilized to prevent the incident light from is emitted out from the cover layer 200 in a direction perpendicular to the substrate body 100, so that the cover layer may satisfy the light shielding property of a black matrix, and when used as a black matrix may enable the incident light to be internally transmitted to pixel units arranged on a side of the black matrix, and when used in a display device, may improve light utilization and achieve an effect of improving display luminance.

The structures of the cover layer shown in FIG. 4 and FIG. 5 are only two of the implementation structures of the cover layer in the display panel of some embodiments of the present disclosure, and the specific structure of the cover layer is not limited to the two implementation structures.

In addition, as shown in FIG. 1 to FIG. 3, when the cover layer 200 includes the light conducting portion 210 and the light shielding portion 220, in order to satisfy the condition that the cover layer 200 acts as a black matrix, the light shielding portion 220 may cover the entire surface of the cover layer 200 in parallel with the substrate body 100.

In some embodiments of the present disclosure, the orthographic projection of the light conducting portion 210 on the substrate body 100 is within the orthographic projection of the light shielding portion 220 on the substrate body 100.

In addition, the light conducting portions 210 in the cover layer 200 may be dispersedly arranged inside the cover layer 200, as shown in FIG. 1, arranged in an array in the cover layer 200, and optionally, uniformly dispersed within the entire cover layer 200 above the substrate body 100.

Based on the above arrangement, the cover layer 200 is formed such that a partial region thereof includes light conducting portions 210 and light shielding portions 220, and a partial region thereof includes only the structure of the light shielding portions 220.

Figure 6:
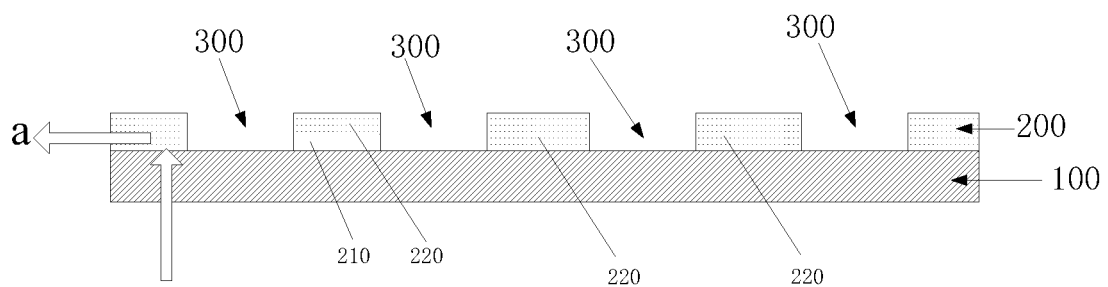
FIG. 6 is a schematic diagram of a cross-sectional structure of a portion A-A of the display substrate shown in FIG. 1.

In some embodiments of the present disclosure, as shown in FIG. 6, the light shielding portion 220 in a partial region of the cover layer 200 is directly formed on the upper surface of the substrate body 100.

In conjunction with FIG. 1, FIG. 3, FIG. 4 and FIG. 5, when a light guiding member is arranged inside a light conducting portion 210 and the light conducting portions 210 are distributed in an array within the cover layer 200, the light guiding members of the structure shown in FIG. 4 or FIG. 5 are arranged in an array within the cover layer 200, alternatively dispersed uniformly within the cover layer 200 so that light luminance of the cover layer 200 is even.

In some embodiments of the present disclosure, light emitted by each of the light guiding members is in the first direction a, i.e., consistent in direction, so as to avoid the problem of uneven luminance caused by light mixing. Optionally, an angle between the first direction and a preset plane (a plane parallel to the substrate body) is less than a preset angle, and the preset angle is less than 45 degrees.

The display substrate in some embodiments of the present disclosure may be a color filter substrate or an array substrate, specifically, a color filter substrate and an array substrate arranged to form a black matrix. The specific technical solution of the present disclosure enables light emitted by the backlight to be concentrated inside the black matrix and transmitted to pixel units arranged on a side of the black matrix, and when applied to a display device, may improve light utilization and achieves an effect of display luminance.

A display panel is further provided in some embodiments of the present disclosure, including the above display substrate.

Referring to FIG. 1 to FIG. 5 and referring to the above detailed description, those skilled in the art should be able to understand the specific structure of the display panel using the display substrate of the above structure, which will not be described in detail herein.

A display device is further provided in some embodiments of the present disclosure, including the above display panel.

Based on the above detailed description, those skilled in the art should be able to understand the specific structure of the display device using the above display panel, which will not be described in detail herein.

With the improvement of the structure of the display substrate, the display panel and the display device embodying the display substrate according to the present disclosure have higher image display luminance relative to the related art.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A display substrate, comprising a light transmitting substrate body and a cover layer arranged on the substrate body to form a predetermined pattern, a plurality of pixel unit spaces are in the predetermined pattern;
   wherein the cover layer is configured to enable light incident from a side of the substrate body to the cover layer to be concentrated inside the cover layer and transmitted, and pass through the cover layer in a first direction, an angle between the first direction and a preset plane is less than a preset angle, the preset plane is parallel to the substrate body, and the preset angle is less than 90 degrees.

2. The display substrate according to claim 1, wherein the cover layer comprises light conducting portions and light shielding portions;
   wherein at least a part of the light shielding portions are arranged on a side of the light conducting portions away from the substrate body;
   the light conducting portions are configured to enable the light incident to the cover layer to be concentrated inside the cover layer and pass through the cover layer in the first direction.

3. The display substrate according to claim 2, wherein the cover layer comprises a base layer made of a light shielding material, wherein light guiding paths are arranged inside the base layer, and light guiding members are arranged within the light guiding paths; and
   the light conducting portions comprise the light guiding paths and the light guiding members, and the light shielding portions each include comprises a portion on the base layer other than the light guiding path.

4. The display substrate according to claim 2, wherein the cover layer comprises a base layer made of a light transmitting material and a light shielding layer arranged on a surface of the base layer away from the substrate body; wherein light guiding members are arranged inside the base layer,
   the light conducting portions comprise the base layer and the light guiding members, and the light shielding portions comprise the light shielding layer.

5. The display substrate according to claim 3, wherein each light guiding member comprises a light concentrating member and a light reflecting member, and the light reflecting member is arranged on a side of the light concentrating member away from the substrate body.

6. The display substrate according to claim 5, wherein the light concentrating member comprises at least one convex lens, and the light reflecting member comprises at least one triangular prism.

7. The display substrate according to claim 2, wherein an orthographic projection of each light conducting portion on the substrate body is within an orthographic projection of each light shielding portion on the substrate body.

8. The display substrate according to claim 3, wherein the light guiding members are arranged in an array form within the cover layer.

9. The display substrate according to claim 1, wherein the preset angle is less than 45 degrees.

10. The display substrate according to claim 2, wherein a first region of the cover layer comprises the light conducting portions and the light shielding portions, and the light shielding portions in a second region of the cover layer are arranged on an upper surface of the substrate body.

11. The display substrate according to claim 1, wherein the display substrate is a color filter substrate or an array substrate.

12. The display substrate according to claim 4, wherein each light guiding member comprises a light concentrating member and a light reflecting member, and the light reflecting member is arranged on a side of the light concentrating member away from the substrate body.

13. The display substrate according to claim 4, wherein the light guiding members are arranged in an array form within the cover layer.

14. A display panel comprising the display substrate according to claim 1.

15. A display device comprising the display panel according to claim 12.

* * * * *